US012594541B2

(12) United States Patent
Bootland et al.

(10) Patent No.: US 12,594,541 B2
(45) Date of Patent: Apr. 7, 2026

(54) GETTER ACTIVATION AND USE

(71) Applicant: JOHNSON MATTHEY PUBLIC LIMITED COMPANY, London (GB)

(72) Inventors: Alan Bootland, Billingham (GB); Mikael Carlsson, Billingham (GB); David Davis, Billingham (GB); Jonathon Higgins, Billingham (GB); Andrew Edward Richardson, Billingham (GB); Emma Softley, Billingham (GB); John West, Billingham (GB)

(73) Assignee: Johnson Matthey Davy Technologies Limited, London (GB)

( * ) Notice: Subject to any disclaimer, the term of this patent is extended or adjusted under 35 U.S.C. 154(b) by 358 days.

(21) Appl. No.: 18/264,010

(22) PCT Filed: Mar. 3, 2022

(86) PCT No.: PCT/GB2022/050560
§ 371 (c)(1),
(2) Date: Aug. 2, 2023

(87) PCT Pub. No.: WO2022/195248
PCT Pub. Date: Sep. 22, 2022

(65) Prior Publication Data
US 2024/0299909 A1 Sep. 12, 2024

(30) Foreign Application Priority Data
Mar. 17, 2021 (GB) ...................................... 2103659

(51) Int. Cl.
| | |
|---|---|
| *B01J 20/30* | (2006.01) |
| *B01D 53/02* | (2006.01) |
| *B01J 20/02* | (2006.01) |
| *B01J 20/28* | (2006.01) |
| *B01J 20/32* | (2006.01) |

(52) U.S. Cl.
CPC .......... *B01J 20/3078* (2013.01); *B01D 53/02* (2013.01); *B01J 20/0225* (2013.01); *B01J 20/28014* (2013.01); *B01J 20/28059* (2013.01); *B01J 20/3085* (2013.01); *B01J 20/3236* (2013.01); *B01D 2253/1122* (2013.01); *B01D 2253/25* (2013.01); *B01D 2253/306* (2013.01); *B01D 2257/108* (2013.01)

(58) Field of Classification Search
CPC . B01D 53/02; B01J 20/02; B01J 20/28; B01J 20/30; B01J 20/32
See application file for complete search history.

(56) References Cited

U.S. PATENT DOCUMENTS

| | | | |
|---|---|---|---|
| 4,250,060 A | 2/1981 | Banks et al. | |
| 4,668,424 A | * 5/1987 | Sandrock | ................ F04B 37/04 |
| | | | 423/248 |
| 5,716,588 A | 2/1998 | Vergani et al. | |
| 5,928,985 A | 7/1999 | Williams | |
| 8,558,364 B2 | * 10/2013 | Summers | ............ B81C 1/00285 |
| | | | 445/27 |
| 9,064,668 B2 | 6/2015 | Coda et al. | |
| 2003/0094098 A1 | 5/2003 | Watanabe | |
| 2012/0068300 A1 | 3/2012 | Summers | |
| 2012/0115715 A1 | 5/2012 | Wolters | |
| 2013/0184360 A1 | 7/2013 | Eri | |

FOREIGN PATENT DOCUMENTS

| | | |
|---|---|---|
| CN | 102 387 857 A | 3/2012 |
| CN | 104 871 284 A | 8/2015 |
| EP | 0719609 A2 | 7/1996 |
| EP | 0926258 A2 | 6/1999 |
| EP | 2 006 011 A1 | 12/2008 |
| EP | 2 841 377 A1 | 3/2015 |
| GB | 2118453 A | 11/1983 |
| WO | 2013/160746 A1 | 10/2013 |
| WO | 2014/091355 A1 | 6/2014 |
| WO | 2015/015221 A1 | 2/2015 |

OTHER PUBLICATIONS

Morris Argyle, et al., "Heterogeneous Catalyst Deactivation and Regeneration: A Review", Catalysts, vol. 5, No. 1, Feb. 26, 2015 (Feb. 26, 2015), pp. 145-269, XP055652473,DOI: 10.3390/catal5010145; cited in the application; table 5; p. 172, last paragraph.

Moulijn J A, et al., "Catalyst deactivation: is it predictable?—What to do?", Applied Catalysis A: General, Elsevier, Amsterdam, NL, vol. 212, No. 1-2, Apr. 30, 2001 (Apr. 30, 2001), pp. 3-16, XP004239090, ISSN: 0926-860X, DOI: 10.1016/S0926-860X(00)00842-5 figure 7 2.3 Thermal degradation; p. 9, left-hand column, paragraph 2nd—p. 12, left-hand column table 3.

"Handbook of Vacuum Technology", Wiley-VCH Verlag Gmbh & Co. KGaA; Jun. 9, 2016 (Jun. 9, 2016), pp. 463-510, XP055866415, Weinheim, Germany DOI: 10.1002/9783527688265.chll ISBN: 978-3-527-41338-6 Retrieved from the Internet: URL: https://onlinelibrary.wiley.com/doi/pd fdirect/10.1002/9783527688265.ch11 Chapter 11.3, Getter.

* cited by examiner

*Primary Examiner* — Sharon Pregler

(74) *Attorney, Agent, or Firm* — BakerHostetler

(57) ABSTRACT

A method for removing a contaminant from an environment is described comprising the steps of: (i) heating a reduced and passivated getter material containing crystallites of a metal in elemental form encapsulated by a layer comprising an oxide of the metal to a temperature in the range (TT−X) to (TT+Y), where TT is the Tammann temperature of the metal in elemental form in degrees Centigrade, X is 400 and Y is 200, to form an activated getter material having active surface for contaminant removal and (ii) exposing the activated getter material to the environment containing the contaminant.

16 Claims, No Drawings

GETTER ACTIVATION AND USE

This invention relates to methods of activating getters and their use to remove contaminants.

Getters are sorbent compositions, which may function by adsorption or absorption, often used within a container to remove unwanted materials from the atmosphere within the container. The container may, for example, be a housing for electrical or electronic devices. Alternatively, the container may be used to maintain vacuum, or be part of an insulating unit under vacuum, where the getter is used to maintain the vacuum.

Getter compositions are known. For example, WO2015/015221 discloses a getter composition suitable for gettering hydrogen and moisture comprising an alkaline earth metal oxide, or precursor thereto, and a transition metal oxide, or a precursor thereof, wherein said transition metal is selected from copper, nickel and cobalt. A class of getters, known as non-Evaporable Getter (NEG) are mostly porous alloys or powder mixtures of Al, Zr, Ti, V and Fe. EP0719609 (A2) discloses a process for producing non-evaporable getter materials by mixing a metallic getter element, one or more getter alloys and a solid organic compound, with all components being in the form of powders having specific particle sizes. These alloys may be thermally activated to produce metal surfaces that adsorb or absorb contaminant gases such as hydrogen, water, oxygen and carbon oxides and therefore act as a means to maintain a high vacuum, for example in vacuum packaging, or to main purity of a gas. However, NEG alloys are limited by the very low metal surface areas, for example as shown in EP0719609 (A2), where the surface areas were less than 0.2 m²/g.

Whilst the getter compositions of the prior art are useful in many applications, there are limitations placed on them by the inherent low surface area of metal that is active towards gettering. We have found a method that overcomes the limitations of the prior art methods and provides significantly greater active gettering surface areas.

Accordingly the invention provides a method for removing a contaminant from an environment comprising the steps of: (i) heating a reduced and passivated getter material containing crystallites of a metal in elemental form encapsulated by a layer comprising an oxide of the metal to a temperature in the range $(T_T–X)$ to $(T_T+Y)$, where $T_T$ is the Tammann temperature of the metal in elemental form in degrees Centigrade, X is 400 and Y is 200, to form an activated getter material having a surface active for contaminant removal, and (ii) exposing the activated getter material to the environment containing the contaminant.

The Tammann temperature is a known attribute of metals and is the temperature at which the atoms or molecules of the solid acquire sufficient energy for their bulk mobility and reactivity to become appreciable. The Tammann temperature is typically one-half of the melting point, for example the Tammann temperature for copper is 405° C., for cobalt is 604° C., for iron is 631° C. and for nickel is 590° C.

The heating step produces an activated getter material having a surface active for the removal of the contaminant, such as a contaminant gas, from the environment. The environment may be an inert gas, such as nitrogen, helium or argon, or may be a vacuum or partial vacuum.

The heating step may be performed on the reduced and passivated getter material before, during or after it is transferred to a container in which it is to be used. Accordingly, the method may include a step of installing the reduced and passivated getter material or the activated getter material in a container in which it is to be used. In one arrangement, the container may be a flow-through container, i.e. a container or vessel through which an inert fluid, such as an inert gas, may be passed. In another arrangement, the container is sealed, in which case the method may further comprise a step of sealing the container under a vacuum or an inert gas to form a sealed container. The heating step to generate the activated getter may be conducted before, during or after the sealing step.

The method may be applied to reduced and passivated getter material containing any metal capable of capturing or gettering the contaminant. The metal may be present in the reduced and passivated getter material in an amount in the range of 1 to 95% by weight (expressed as the metal).

The method may be particularly applied to getters containing metals selected from copper, cobalt, iron and nickel. The applicants have found that nickel-containing getters are particularly suitable for activation by the present method. Reduced and passivated nickel getters activated by the present method may have a nickel content, expressed as Ni, in the range of 1 to 95% by weight, preferably 10 to 60% by weight, more preferably 30 to 60% by weight.

The reduced and passivated getter material contains crystallites of a metal in elemental form encapsulated by a layer comprising an oxide of the metal. Unlike NEG materials, the crystallites are dispersed over the surface of a support that physically separates the metal crystallites providing the getter with a higher metal surface area than achievable for the NEG materials. The crystallites may be formed by precipitation of reducible metal compounds and support compounds from solution or impregnation of reducible metal compounds on a support. The reduced metal surface area of the getters in the present invention may be in the range 5 to 50 m²/g.

By "reduced and passivated" we mean that the getter contains a metal reducible to elemental form, that has been subjected to a prior reduction step to form metal in elemental form ex-situ, i.e. not in the container in which it is to be used, and that the metal in elemental form has been passivated to prevent spontaneous uncontrolled oxidation from atmospheric oxygen by encapsulating it in a layer comprising the oxide of the metal using a suitable oxidising treatment. The layer comprising metal oxide may consist of metal oxide or may include metal carbonate. The layer comprising metal oxide provides a barrier against bulk oxidation of the getter so that it may be safely handled in air without self-heating. The reduction step may be performed using any known method by applying a reducing agent or reducing gas to an oxidic material under conditions to convert at least a portion of the metal oxide into elemental form. For example, by heating the corresponding metal oxide to temperatures in the range 175 to 600° C. in a flow of a reducing gas containing hydrogen. The reducing gas may be pure hydrogen or a diluted hydrogen stream, such as a mixture of hydrogen and nitrogen. The passivation may be performed using any known method by applying an oxidising agent to the reduced getter to re-oxidise a surface layer on the elemental metal and thereby encapsulate the metal in elemental form with a layer comprising metal oxide. For example, passivation may be performed using oxygen, air and/or carbon dioxide, suitably diluted with an inert gas such as nitrogen or agon, under controlled conditions. Such methods are known. For example, methods of making reduced and passivated copper, cobalt and nickel compositions are disclosed in U.S. Pat. No. 5,928,985 (A), US2013184360 (A1) and GB2118453 (A) respectively.

The reduced and passivated getter material desirably possesses only sufficient passivation of the elemental metal to prevent the unwanted self-heating, and depletion of getter capacity during normal handling and transportation. Too little passivation and the getter will be unstable; too much and the heating step will be overly lengthy. Therefore, a preferred degree of oxidation, which may be expressed instead as degree of reduction (DoR) of the passivated getter, is in the range 10 to 90%. For nickel getters the DoR may be 10-90% but is preferably in the range 20 to 80%, more preferably in the range 35-70%. For cobalt getters the DoR may be 10-90% but is preferably in the range 20 to 80%, more preferably in the range 35-65%. For copper getters the DoR may be 10-90% but is preferably in the range 15 to 70%, more preferably 20-50%. The DoR may readily be established by known temperature-programmed reduction (TPR) methods. A suitable method comprises flowing hydrogen through a sample, initially at ambient temperature. While the gas is flowing, the temperature of the sample is increased linearly with time and the consumption of dihydrogen is monitored. The Degree of Reduction (DoR) can then be calculated as a percentage by:

$$DoR = \frac{a}{b} * 100$$

where a is the amount of reducible metal that has been reduced (moles/g) and b is the total amount of reducible metal present in the material (moles/g). Amount of reducible metal that has been reduced can be calculated using the principal oxide phase. For nickel monoxide the ratio for dihydrogen consumption is 1:1, therefore, $$a = b - c$$

where c is the total dihydrogen consumption.

The heating step is performed in the absence of a reducing agent. The heating step may be performed by heating the getter material to the desired temperature. For example, the heating may include, but is not limited to, induction heating or filament heating. The heating step heats the reduced and passivated getter material to a temperature in the range $(T_T-X)$ to $(T_T+Y)$, where $T_T$ is the Tammann temperature of the metal in elemental form in degrees Centigrade, X is 400 and Y is 200, to form a surface active for contaminant removal on the getter material. Without wishing to be bound by theory, the Applicant believes that by heating the reduced and passivated getter material as claimed the material restructures to provide a portion of the metal in elemental form at the surface of metal crystallites, thereby forming an activated getter material with a higher metal surface area than may be achieved with current thermally-activated getter materials. The Tammann temperature is generally one half of the melting point of the metal and may be established from known references, such as "Heterogeneous Catalyst Deactivation and Regeneration": A Review by M. D. Argyle and C. Bartholomew in Catalysts March 2015, 5(1), p 145-269. The lower temperature to which the getter may be heated is given by $T_T-X$ degrees Centigrade, where X is 400. Thus, X may be in the range of 1 to 400. For example, X may be 350, 250, 200, 100 or 50, or less. The upper temperature to which the getter may be heated is given by $T_T+Y$ degrees Centigrade, where Y is 200. Thus, Y may be in the range of 1 to 200. For example, Y may be 150, 125, 100, 75, 50, 25 or less. Above the Tammann temperature, sintering of the metal crystallites can occur causing the metal surface area to drop and so reduce the effectiveness. Accordingly, it is preferred that Y is 100 or less.

Where the getter comprises nickel, the temperature to which the reduced and passivated getter material is heated may be in the range 190 to 790° C., preferably 300 to 700° C., more preferably, most preferably 400 to 600° C.

The reduced and passivated getter material may be heated at a constant or varying ramp rate, and may be heated in one, two or more stages and held at one or more intermediate temperatures, or at the maximum temperature, for a period, which may be termed "dwell period". The heating step may be performed over a time ranging from 5 minutes to 24 hours but is preferably in the range 10 minutes to 5 hours, including any dwell periods at which the getter is maintained at a constant elevated temperature.

In order that the active surface formed by heating is not deactivated by oxidation, the activated getter is used under vacuum or under an inert gas. The vacuum is preferably at least 98.70% ($\geq$1 bar or $\geq$100.01 kPa negative gauge). The inert gas may be any gas that does not react with the metal, and is suitably selected from nitrogen, helium and argon. The oxygen ($O_2$) content of the inert gas should be minimised and is preferably $\leq$0.010% more preferably $\leq$0.002% by volume.

The activated getters prepared by the method of the present invention may be used to remove contaminants selected from one or more of hydrogen, water, oxygen, carbon dioxide, carbon monoxide and a hydrocarbon. The getters have particular utility for gettering or capturing hydrogen.

The getters obtained by the method can be used to preserve vacuum in for example Dewar containers or pipes for transport of oil in cold climates. The getters can also be used to remove contaminants from gaseous atmospheres, either to maintain an environment within an enclosure for example to protect electronic components, or for purification of gas prior to use in for example semi-conductor manufacture.

The invention is now further described by reference to the following Examples.

EXAMPLE 1: REDUCED AND PASSIVATED GETTER MATERIAL PREPARATION

Getter 1 was KATALCO® CRG-F, a precipitated nickel material, commercially available from Johnson Matthey PLC. The material contained 61.3% nickel, expressed as Ni.

The material may be prepared by co-precipitation as described in U.S. Pat. No. 4,250,060.

The getter material was supplied in oxidic form and so was first reduced and passivated as follows: 1 g of the material was charged into a quartz reactor in an Altamira AMI200 Dynamic Chemisorption device. The material was first dried under 50 cc/min argon by raising the temperature to 35° C. and then increasing the temperature at 10° C./min to 100° C. before holding at 100° C. for 60 minutes. The material was then reduced in 100% vol hydrogen flowing over the sample at 50 cc/min. During the reduction step the temperature was increased at 10° C./min up to 650° C., where it was held for 2 hours. The reduced material was then cooled under a 50 cc/min flow of a 50:50 mixture of helium and argon at a rate of 30° C./min to a final temperature of 25° C., where it was held for 30 minutes. The reduced material was then passivated by flowing a mixture of 48 cc/min helium and 2 cc/min oxygen over the reduced material for 60 minutes, held at 25° C. The passivated material was then treated with a mixture of 10 cc/min oxygen and 40 cc/min helium at 25° C. for 60 minutes before discharge from the reactor.

The properties of the reduced and passivated getter material are set out in Table 1:

TABLE 1

| | Getter properties | | |
|---|---|---|---|
| Getter | Ni content (% wt expressed as Ni) | Maximum Reduction Temperature (° C.) | Degree of Reduction (DoR, %) |
| 1 | 61.3 | 460 | 65 |

The Ni content was established using X-Ray Fluorescence (XRF). The DoR was measured as follows: 0.1 g of the reduced and passivated getter material was weighed and charged into a quartz reactor in the Altamira AMI200 Dynamic Chemisorption device. The material was subjected to a drying process whereby it was heated under a flow of 40 ml/min argon to 140° C. at 10° C./min and held for 1 hour. The material was then cooled to room temperature (ca 20° C.). The material was then treated with a mixture of 10% vol hydrogen in argon at 40 ml/min while increasing the temperature at 10° C./min up to 1000° C., where it was held for 15 minutes. The hydrogen consumption was quantified using a thermal conductivity detector. The amount of hydrogen consumed was then used, in conjunction with elemental analysis from XRF, to calculate the degree of reduction of the sample as the moles of hydrogen consumed equals the moles of nickel oxide reduced to nickel metal, according to the chemical equation:

$$NiO + H_2 \rightarrow Ni + H_2O$$

The DoR was then be calculated by the following equation:

$$DoR = \frac{(b - c)}{b} \times 100$$

Where c is the moles of hydrogen consumed during the measurement, and b is the moles of nickel, in any form, present in the original sample analysed.

EXAMPLE 2: ACTIVATION WITHOUT APPLYING A REDUCING GAS

The reduced and passivated getter material from Example 1 was placed in a reaction vessel and heated either under vacuum or under flowing nitrogen gas for 2 hours and the hydrogen adsorption monitored. Hydrogen adsorption is considered to be a measure of gettering capacity of the surface as it occurs primarily once the nickel is in elemental form.

Approximately 1 g of reduced and passivated getter material 1 material was weighed into a glass reaction vessel and heated under nitrogen flow (200 cc/minute) or vacuum using a ramp rate of 10° C./minute to the desired temperature. The material was held at the temperature for a further 120 minutes. The material was then cooled to 35° C. under vacuum then held for 60 minutes below a 10 μmHg (1.333224 Pa). At this point a leak test was conducted. Hydrogen adsorption was then measured at 35° C. over a pressure range 100-760 mmHg (13332.2-101325 Pa), building an adsorption isotherm. The total adsorption at 760 mmHg based on the weight of the oxidic material before reduction and passivation is reported below.

Consecutive runs with increasing activation temperature were conducted on single aliquots of sample, following the method above each time.

The Tammann temperature for Ni is 590° C., and so the temperature range within the invention for Ni is 190-790° C.

Hydrogen adsorption was measured at 35° C. At this temperature no reduction of the nickel oxide layer occurs, and so adsorption demonstrates that a getter surface has been formed by the heating step. The results are set out in Tables 2 and 3.

TABLE 2

| | Heated under nitrogen | |
|---|---|---|
| Getter | Temperature (° C.) | H₂ adsorption (cm³/g) |
| 1 | 300 | 12.1 |
| | 500 | 12.3 |
| | 700 | 8.9 |

TABLE 3

| | Heated under vacuum | |
|---|---|---|
| Getter | Temperature (° C.) | H₂ adsorption (cm³/g) |
| 1 | 120 | 0.1 |
| | 300 | 10.3 |
| | 500 | 10.8 |
| | 700 | 8.5 |

The results demonstrate that a getter surface has been generated. Heating at 700° C., 110 degrees above the Tammann temperature for nickel, appears to reduce $H_2$ adsorption compared to the heating at 500° C.

The hydrogen adsorption isotherms generated after heating getter material 1 under vacuum were also used to calculate associated nickel surface areas. The results are set out in Table 4.

TABLE 4

| | Heated under vacuum | |
|---|---|---|
| Getter | Temperature (° C.) | Metal surface area (m²/g) |
| 1 | 120 | <0.1 |
| | 300 | 31.4 |
| | 500 | 34.2 |
| | 700 | 26.8 |

Metal surface areas are quoted per gram of material at the start of the measurement. It can clearly be seen that metal surface areas achievable by the method are in excess of 10 m² per gram of getter.

The invention claimed is:

1. A method for removing a contaminant from an environment comprising the steps of: (i) heating a reduced and passivated getter material containing crystallites of a metal comprising nickel, cobalt, or copper in elemental form encapsulated by a layer comprising an oxide of the metal and dispersed over the surface of a support to a temperature in the range $(T_T-X)$ to $(T_T+Y)$, where Tris the Tammann temperature of the metal in elemental form in degrees Centigrade, X is 400 and Y is 200, to form an activated getter material having a surface active for contaminant removal and a reduced metal surface area in the range of 5 to 50 m²/g and (ii) exposing the activated getter material to the environment containing the contaminant.

2. The method according to claim 1, wherein the heating step is performed on the reduced and passivated getter material before, during or after it is transferred to a container in which it is to be used.

3. The method according to claim 2, further comprising a step of sealing the container under a vacuum or an inert gas to form a sealed container.

4. The method according to claim 1, wherein the metal in the reduced and passivated getter material comprises nickel.

5. The method according to claim 4, wherein the nickel content of the reduced and passivated getter material is in the range 1 to 95% by weight.

6. The method according to claim 1, wherein the crystallites of the metal in elemental form encapsulated by the layer comprising an oxide of the metal are formed by precipitation of reducible metal compounds and support compounds from solution or impregnation of reducible metal compounds on a support.

7. The method according to claim 1, wherein the reduced and passivated getter material has a degree of reduction in the range of 10 to 90%.

8. The method according to claim 1, wherein the heating step is performed under a vacuum of at least 98.7%.

9. The method according to claim 1, wherein the heating step is performed under an inert gas selected from nitrogen, helium and argon.

10. The method according to claim 1, wherein the metal in the reduced and passivated getter material is nickel and the temperature to which the reduced and passivated getter material is heated is in the range 190 to 790° C.

11. The method according to claim 1, wherein the contaminant is selected from one or more of hydrogen, carbon dioxide, water, oxygen, carbon monoxide and a hydrocarbon.

12. The method according to claim 1, wherein the contaminant is hydrogen.

13. The method according to claim 4, wherein the nickel content of the reduced and passivated getter material is in the range 10 to 60% by weight.

14. The method according to claim 1, wherein the heating step is performed under nitrogen containing less than 0.010% by volume of oxygen.

15. The method according to claim 1, wherein the metal in the reduced and passivated getter material is nickel and the temperature to which the reduced and passivated getter material is heated is in the range 300 to 700° C.

16. The method according to claim 1, wherein the metal in the reduced and passivated getter material is nickel and the temperature to which the reduced and passivated getter material is heated is in the range 400 to 600° C.

* * * * *